Patented Oct. 9, 1951

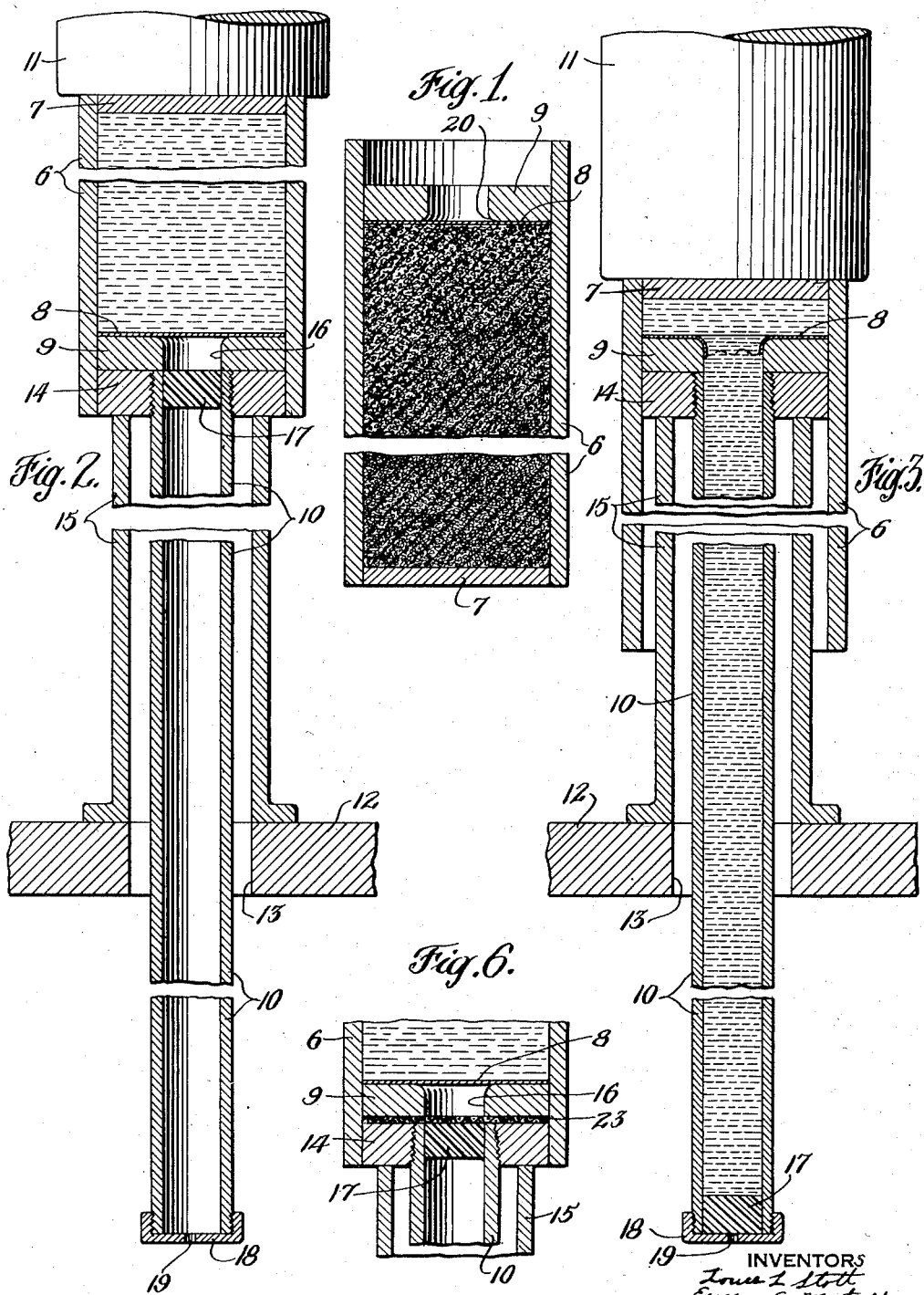

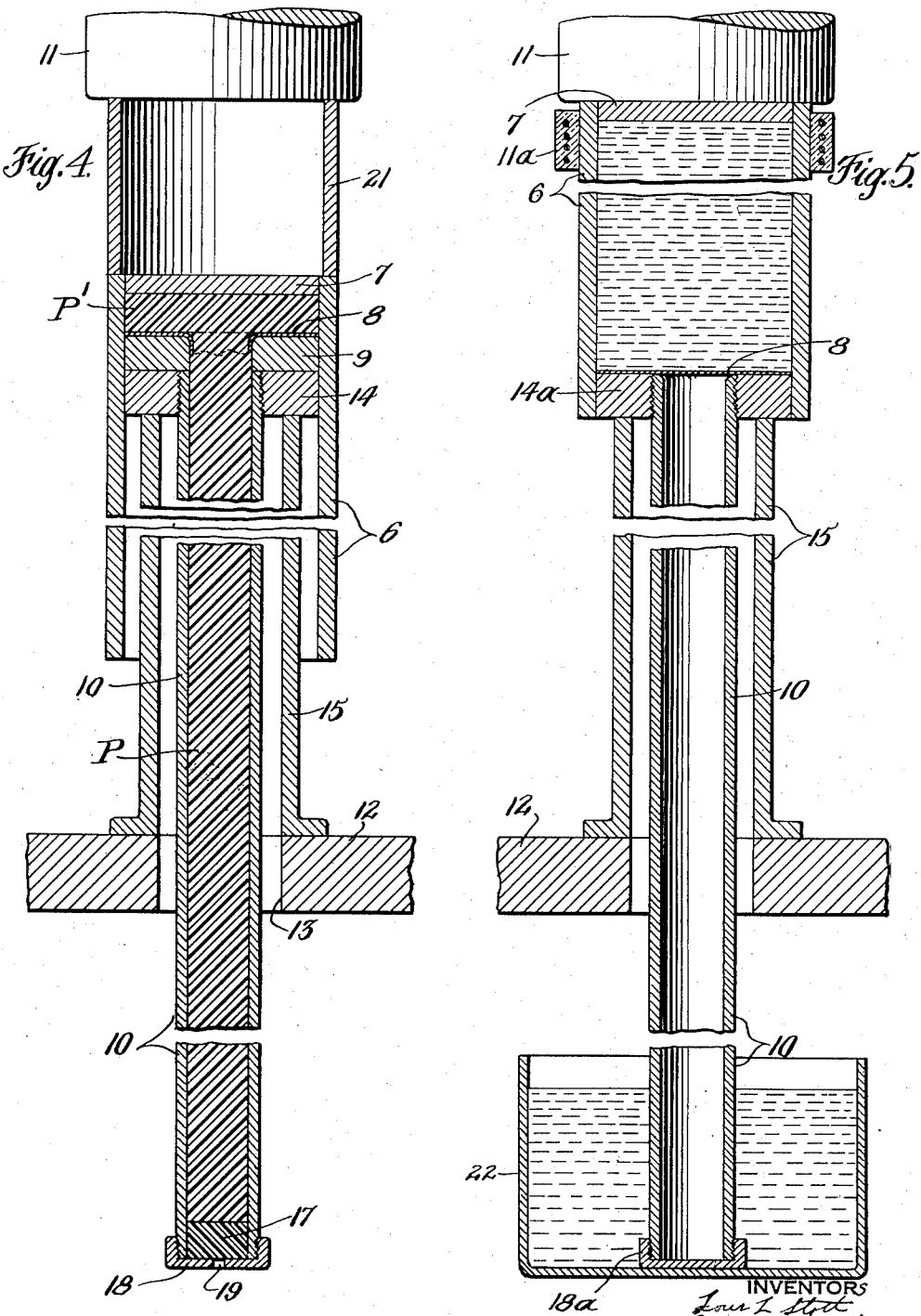

2,570,284

UNITED STATES PATENT OFFICE 2,570,284

EQUIPMENT FOR MOLDING ELONGATED ARTICLES FROM PLASTIC MATERIALS

Louis L. Stott and Eugene E. Montross, Reading, Pa., assignors to The Polymer Corporation, Reading, Pa., a corporation of Pennsylvania Application February 18, 1947, Serial No. 729,330

13 Claims. (Cl. 18—30)

This invention relates to equipment for molding plastic materials, and is particularly concerned with the molding of elongated pieces such as rods or bars of relatively small cross-section or diameter. Thus, the invention is especially concerned with the molding of elongated rods of diameter less than about 1¼ inches.

One of the objects of the invention is to provide equipment for the above general purpose which is capable of molding small diameter rods or the like of considerable length, for instance upwards of about three or four feet, it being possible according to the invention to mold rods even as long as twelve feet.

In considering certain other objects and advantages of the invention, it is first noted that when employing some of the moldable thermoplastic materials, especially those which are characterized by relatively high volumetric shrinkage upon solidification (for instance synthetic linear polyamides known to the trade as nylon), it is of importance in securing soundness in and toughness of the piece that the molding be effected under high pressure applied axially thereof and preferably also under conditions effecting directional cooling from one end of the piece to the other. These requirements, particularly the molding under axially applied pressure, introduce problems with respect to the equipment to be employed, especially because of the fact that a relatively long small diameter tubular mold is readily subject to transverse flexure, which would result in the production of an elongated piece having an undesired lengthwise curvature therein.

With the above in mind, it is a further important object of the invention to arrange the molding equipment so as to provide for the application of high pressure axially of the piece being molded while at the same time placing the elongated tubular mold under tension to thereby avoid or reduce transverse flexure of the mold.

Another object of the invention is to provide a molding technique for elongated rods and the like according to which little if any loss of material is encountered even where only a single or a few pieces of given kind are molded. This is in distinct contrast with known extrusion molding technique in which very considerable loss of material is customarily encountered in establishing initial operation, since a preliminary run of the extrusion equipment is required in order to adjust the several variables to the values producing a sound extruded product.

The invention also facilitates the manufacture of rods and the like of intermixed plastic materials of different colors, where mottled and similar color effects are desired. This effect can readily be achieved in accordance with the invention, and in this respect the technique of the invention is in distinct contrast with extrusion molding in which the feed screw customarily employed tends to churn up the plastic materials of different color to such an extent as to destroy the desired mottled effect in the finished piece.

How the foregoing objects and advantages are attained will appear more fully from the following description referring to the accompanying drawings in which—

Figure 1 is a vertical sectional view through a container for plastic material to be molded, constructed according to the invention;

Figure 2 is a vertical sectional view through equipment according to the invention including the container of Figure 1 assembled with an elongated tubular mold and certain other parts;

Figure 3 is a view similar to Figure 2 but illustrating a different position of various parts;

Figure 4 is a view similar to Figures 2 and 3 but illustrating certain additional parts employed according to the invention after the completion of the molding of a piece;

Figure 5 is a view similar to Figure 2 but illustrating a modified arrangement of the equipment; and Figure 6 is a fragmentary view similar to a portion of Figure 1 but illustrating another feature.

Various features of the invention are of applicability in the molding of a wide variety of plastic materials, especially those characterized by shrinkage upon solidification and/or relatively high fluidity in the molten condition. Thus the invention may be used to mold thermoplastic materials such as nylon, ethyl cellulose, cellulose acetate, and cellulose acetate butyrate. Nylon is a material to which the invention is especially adapted, since this material is characterized both by high shrinkage upon solidification and by high fluidity in the molten condition. Therefore, for purposes of illustration hereinafter, it is assumed that the equipment is to be employed in the molding of a synthetic linear polyamide, such as the polyamide formed as the reaction product of hexamethylene diamine and adipic acid, this material having a melting point in the neighborhood of 505° F. and being characterized by a substantial volumetric shrinkage upon solidification, and by high fluidity when molten.

The polyamide material, preferably in flake or granular form is charged into a container 6, as is indicated in Figure 1. The container 6 advantageously takes the form of a steel tube one end of which is closed by a plug 7 preferably formed of a metal such as bronze having a coefficient of thermal expansion higher than that of the metal of which the tube is formed, the plug being proportioned or dimensioned so that at relatively low temperature, for instance room temperature, it may be inserted and removed from the container tube and further so that at molding temperature the expansion of the plug will provide a liquid tight seal with the wall of the container tube.

The polyamide is preferably packed tightly in the container tube and a thin diaphragm 8 is placed on top of the charge, after which an apertured plug 9 is introduced into the container, all as clearly shown in Figure 1. The diaphragm 8 may be made of thin metal sheeting, so that during the molding operation, as described below, the diaphram may be ruptured by the application of pressure in order to discharge the molten polyamide into the mold tube. The plug 9 is advantageously made of a metal, such as bronze, having a relatively high coefficient of thermal expansion as in the case of plug 7.

After charging a container as described above with relation to Figure 1, the container and the charge therein is then heated to melt the polyamide. The heating is advantageously effected by immersing of the container in a heating bath, such as a molten salt maintained at an appropriate temperature somewhat above the melting point of the polyamide.

When the container and the charge therein have been brought to the desired temperature, the container is assembled with other equipment as shown in Figure 2. Thus it will be seen that the container is inverted as compared with the position of Figure 1, and brought together with an elongated mold tube 10. The tube 10 is also desirably preheated to a specific temperature which will vary somewhat with the length and diameter of the rod, and with the material being handled. When molding polyhexamethylene adipamide the mold tubes are desirably preheated in the range of 350° to 500° F. From Figure 2 it will be seen that the equipment is associated with a press including relatively movable press members, such as the plunger 11 and the support or bed plate 12, the latter being apertured as at 13 so as to permit the lower end of tube 10 to project therethrough. It may here be noted that while the present description and the drawings disclose the equipment as being arranged with the axis of the mold tube extended vertically, the equipment may, of course, be arranged horizontally. The latter arrangement, may indeed be preferable in cases where exceptionally long mold tubes are being used.

From Figure 2 it will be observed that at the upper end of the mold tube an abutment ring 14 is secured thereto, as by being threaded on the tube. The ring 14 is shaped so as to enter the adjacent end of the container tube 6, although this ring need not necessarily be of especially tight fit, since leakage of the molten polyamide out of the container is prevented by the liquid tight seal provided between the container tube wall and the apertured plug 9.

The tube 10 is supported on the press member 12 by means of a sleeve 15 which surrounds the entrance end of the mold tube but which is of smaller diameter than the container tube 6. In addition to serving as a support for the entrance end of the mold tube 10, the sleeve 15 further serves as an element through which pressure is applied to the molten polyamide in the container 6.

Figure 2 further shows that the aperture 16 in the plug 9 is in registry with the cavity in the tube 10, although it may be mentioned that the aperture 16 need not necessarily be of the same diameter as the inside diameter of the mold tube. When the equipment is initially assembled as in Figure 2 a plug 17 is also desirably positioned in the entrance end of the mold tube 10, this plug advantageously being formed of a synthetic resin having high heat resistance, for instance, polytetrafluoroethylene. The plug has a snug fit in tube 10 and is driven down to the bottom end of the tube when the molten plastic is introduced into the tube, as described herebelow with reference to Figure 3. The bottom end of mold tube 10 is provided with a threaded closure member 18 advantageously having a vent 19 therethrough, through which air is discharged from the mold tube ahead of the plug 17 when the plug is driven down in the molding operation.

Turing now to Figure 3, it will first be noted that the press plunger 11 has been forced downwardly, carrying with it the container 6 which, in this position telescopes with the sleeve 15. The polyamide material is at this time in molten condition, as is indicated in Figure 3 (and also in Figure 2). When the pressure is first applied through the plunger 11, it builds up to a point where the diaphragm 8 is ruptured, to thereby permit delivery of the molten polyamide through the aperture 16 in the plug 9 and into the entrance end of the mold tube. Thus, in Figure 3 the diaphragm 8 is shown as being ruptured and the mold tube is shown as being filled with the plastic, plug 17 having been driven to the bottom. With respect to the diaphragm 8 and the aperture 16 in the plug 9 it is noted that the edge of the aperture 16 adjacent to the diaphragm is chamfered, preferably rounded as shown at 20 in Figure 1. This shape is employed for the reason that it minimizes tendency for pieces of the diaphragm to break off when it is ruptured under the build-up of pressure, thereby avoiding lodging of metal pieces in the article being molded.

The polyamide now begins to solidify because of drop in temperature and during the course of solidification and also during a range in temperature extending appreciably below the melting point of the polyamide, the pressure applied through the press members 11 and 12 is kept at a high value, for instance from about 15,000 pounds to about 30,000 pounds per square inch, advantageously a pressure of the order of about 20,000 pounds per square inch. As the polyamide solidifies the material in the container 6 remains molten longer than that in the mold tube, due to the greater mass of the material in the container and of the container itself, as compared with that of the mold tube. As a result, cooling occurs progressively from the remote end of the mold tube. This progressive or directional cooling may be accentuated according to the invention either by cooling the remote end of the mold tube or by warming the material in the container 6, or by both of these expedients, for instance, in the manner more fully disclosed herebelow with reference to the arrangement of Figure 5.

Notwithstanding the high volumetric shrinkage which the polyamides manifest upon solidification, we have found that the application of high pressure axially to the piece being molded under the conditions herein discussed results in the formation of a completely sound molded article quite accurately conforming with the shape of the mold itself. We have found further that the molding of rods or the like under these conditions results in greatly improved physical properties of the molded article as compared with articles which are subjected only to relatively low pressures such for example, as are available by employment of gas pressure. The reasons why these improved effects are secured are not completely understood, but the improved results may be due at least in part to an actual "working" of the molded material in solidified or partially solidified state.

Whatever the reasons, we have found that both directional cooling and high pressure (of the order hereinabove indicated) are of importance in securing sound molded articles of good physical properties, especially where the rods or the like being molded are greater than about three feet in length.

After the temperature has dropped considerably, for instance below about 200° F. the piece may be taken out of the mold and the container and mold separated, for which purpose it is preferred to employ equipment such as illustrated in Figure 4. Thus, upon completion of a molding operation the press plunger 11 is raised and a sleeve 21 is introduced between the plunger and the upper end of the container tube 6, the inside diameter of sleeve 21 preferably being greater than the inside diameter of the container tube. The plunger 11 is again brought down so as to force the container sleeve 6 downwardly and thereby disengage therefrom, all of the plugs and parts, including the abutment ring 14, the apertured plug 9 and the end closure plug 7.

As shown in Figure 4 a molded piece, such as the rod P is connected at its upper end with a part P' which comprises an excess of the polyamide initially charged into the container 6. Employment of a slight excess of material is preferred, so as to insure a sufficient volume of material in the container to fill all voids in the mold tube as the material solidifies and shrinks while the high pressure is being applied.

It will be noted that in the arrangement described above the mold tube is supported only at its entrance end, in view of which no compression loads are carried in the wall of the mold tube even after the piece is solidified, and, in addition, the wall of the mold tube is even placed under tension, all of which is of great importance in avoiding undesired transverse flexure of the mold tube. Because of these features and further since the diameter of the container 6 is preferably considerably greater than that of the mold tube, it is practicable to mold elongated pieces such as rods of considerable length, even up to 10 or 12 feet. The equipment and method described also facilitate accurate molding of perfectly straight pieces even of very small diameter, for instance down to about ¼ inch diameter. The fact that the container 6 is of considerably greater diameter than that of the mold tube enables the molding of a greatly elongated piece with only a moderate throw or range of movement of the press plunger.

Another advantage of the equipment and method described is that while the polyamide is being heated and melted in the container 6, it is substantially closed as against ingress of air, as a result of which oxidation of the material to be molded is greatly reduced. Similarly, the employment of plug 17 in the entrance end of the mold tube serves to reduce contact of the material with air while in the molten condition. These factors are of considerable importance with many plastic materials and especially with polyamides of the type mentioned, since they are quite subject to oxidation or degradation in the molten state.

In the modified arrangement of Figure 5 the container 6 is again provided with a closure 7 at one end, but in this case the apertured plug 9 of the first form described is omitted, the abutment ring 14a here being made of metal having a coefficient of expansion higher than that of the container tube so as to provide the desired liquid tight fit when the parts are at molding temperature. The diaphragm 8 may serve to close the container as against ingress of air during heating of the polyamide in the container. Upon buildup of pressure the diaphragm 8 will be ruptured, as in the equipment first described, the polyamide then being delivered into the entrance end of the mold tube 10 to fill the tube. It will further be observed that in the equipment of Figure 5 plug 17 referred to in connection with the first form of equipment has been omitted; and also that the bottom closure member 18a is not provided with a vent hole such as shown at 19 in Figures 2, 3 and 4. Here it is contemplated that the threading of the closure 18a onto the bottom end of the tube 10 be such as to permit exhaust of air therethrough, although when the material being molded reaches the bottom end of the tube solidification thereof results in a liquid tight seal which prevents loss of the polyamide under the high molding pressure applied.

In Figure 5 there is further illustrated the employment of a heating unit such as an electric heating ring 11a surrounding the upper part of container 6. Use of such a heating element is contemplated for the purpose of retarding cooling at the upper end and thereby accentuating the directional cooling from the lower end. This directional cooling may further be accentuated by employing any suitable means for cooling the lower end of the mold tube. Thus in Figure 5 there is illustrated a receptacle 22 surrounding the lower end of the mold tube 10 and adapted to contain a liquid cooling medium. These features for accentuating directional cooling may, of course, be employed in the arrangement of Figures 1 to 4.

In Figure 6 still another feature is disclosed. This figure shows various parts of the equipment appearing in Figure 1 at the upper end of the mold tube 10. Here it will be seen that a perforated element 23 has been introduced between plug 9 and the abutment 14. The element 23 may take the form of a perforated disc or one or more screens and serves to positively prevent pieces of the diaphragm 8 from lodging in the article being molded in the mold tube. Such a screen or perforated disc is further of advantage since it serves to screen out any foreign bodies which may have inadvertently been introduced into the container 6 during charging thereof, as well as particles of unmelted polyamide. If mechanical cleaning is impossible, such a screen or disc may be recovered for re-use as by dissolving or melting the polyamide in which it is embedded.

We claim:

1. Equipment for molding plastic materials to elongated shapes comprising, in combination with a pair of relatively movable press members for developing molding pressure, an elongated tubular mold having an external abutment projecting from its entrance end, a sleeve surrounding the entrance end portion of the mold and serving to transmit molding pressure from one of the press members to said abutment, and a tubular container for plastic material to be molded, the container being of substantially larger diameter than the mold and having opposed relatively movable walls one of which is apertured to deliver material to be molded from the container into the mold and is arranged to receive molding pressure through said sleeve, the other of said walls being arranged to receive molding pressure from the opposite press member, whereby upon actuation of the press members the material in the container is placed under pressure and is delivered to the mold through its entrance end and placed under pressure in the mold.

2. A construction according to claim 1 and further including a rupturable diaphragm in the container between the material therein and the said apertured wall of the container.

3. A construction according to claim 2 in which the edge of the wall aperture adjacent the diaphragm is chamfered to thereby minimize tendency for breaking-off of pieces of the diaphragm upon rupturing thereof.

4. A construction according to claim 1 and further including a perforated member at the entrance end of the mold tube through which the material being molded passes when it is delivered from the container into the mold tube.

5. A construction according to claim 2 and further including a perforated member between the rupturable diaphragm and the entrance end of the mold tube.

6. Equipment for molding plastic materials to elongated shapes comprising, in combination with a pair of relatively movable press members for developing molding pressure, an elongated tubular mold, a tubular container for plastic material to be molded, the container being of substantially larger inside diameter than the outside diameter of the mold and adapted to telescope with the mold, and the container having end walls one of which is arranged to receive molding pressure from one press member and the other of which bridges the space between the mold and container and is apertured to deliver plastic material to the mold and is movable in the container, and a sleeve surrounding the mold and adapted to transmit molding pressure from the other press member to said movable container wall, the sleeve being of smaller ouside diameter than the inside diameter of the container to provide for telescoping of the sleeve into the container.

7. Equipment for molding plastic materials to elongated shapes, comprising a container for plastic material to be molded having an apertured plug slidable therein and through which pressure is adapted to be applied to the material to be molded, a sleeve of smaller outside diameter than the inside diameter of the container, arranged coaxially of the container and adapted to be telescoped into the container to transmit pressure to the plastic material through said plug, and an elongated tubular mold member within the sleeve with one end in communication with the aperture of said plug to receive plastic material therethrough from the charge of said material in the container, and said one end of the mold member being connected with the apertured plug to provide for placing the mold member under tension during application of the molding pressure.

8. A construction according to claim 7 and further including a slidable plug in the mold member adapted to be positioned in the entrance end thereof at the beginning of a molding operation and to be moved axially through the mold member under the influence of plastic material entering the mold member.

9. A construction according to claim 7 in which the container is of substantially larger diameter than the mold member whereby to provide for the molding of an elongated piece of substantially greater length than the extent of movement of the press members toward each other.

10. Equipment for molding plastic materials adapted for use with a pair of opposed press members for developing molding pressure, comprising an elongated tubular mold having an opening at one end for introduction of plastic material to be molded and having a closure at the other end adapted to serve as a reaction point for pressure applied to plastic material therein, a cylindrical container for plastic material to be molded, said container being arranged coaxially of the tubular mold and being of larger diameter than any cross-sectional dimension of the mold, and end closures for the cylindrical container adapted to be respectively associated with the press members, one of said end closures being apertured and connected with the entrance end of the tubular mold to provide for delivery of material to be molded from the container into the mold and for build up of pressure on the material in the mold, said apertured end closure for the container with which the entrance end of the tubular mold is connected constituting a plug slidable within the container, to provide for telescoping of the container and tubular mold, a sleeve surrounding the entrance end of the tubular mold and adapted to be associated at one end with one of the press members and adapted at the other end to bear against said plug, the sleeve being of larger inside diameter than any cross-sectional dimension of the tubular mold and being of smaller outside diameter than the inside diameter of the container, whereby upon actuation of the press members the sleeve telescopes into the container.

11. A construction according to claim 1 in which the container has a cylindrical cavity therein and in which said apertured container wall comprises a plug having a liquid-tight fit in the container cavity and is slidable into the container cavity during a molding operation.

12. Equipment for pressure molding of plastic material to elongated shapes, comprising a pair of spaced apart press members actuable toward one another along a pressing axis, a container disposed between said members and having a cylindrical cavity for molten plastic material, a mold of smaller outside diameter than the diameter of the cavity and of length greater than the space between said members, the cavity and the entrance end of the mold being in alignment with one another along said pressing axis, a mold closure for the other end of the mold, a container closure for each end of the container, one of said container closures being fitted to the inner cylindrical surface of the cavity, being slidable therein and being apertured to provide communication between the container and the entrance end of the mold, and each container closure being interposed in compression between a press member and material in the cavity during actuation of the press to apply pressure to such material and to deliver material from the container into the mold, the entrance end of the mold being anchored on the press member with which the apertured closure is associated and a compression element between said apertured closure and its associated press member for transferring compressive force therebetween, said element being of smaller diameter than the internal diameter of said cavity to permit telescoping of said element into said cavity.

13. Equipment in accordance with claim 12, in which said compression element comprises a sleeve interposed between said closure and said press member and surrounding said mold.

LOUIS L. STOTT.
EUGENE E. MONTROSS.

REFERENCES CITED

The following references are of record in the file of this patent:

UNITED STATES PATENTS

| Number | Name | Date |
| --- | --- | --- |
| 461,721 | Thurfelder | Oct. 20, 1891 |
| 773,844 | Aspinwall | Nov. 1, 1904 |
| 1,560,368 | Bartels et al. | Nov. 3, 1925 |
| 2,013,273 | Jonsson | Sept. 3, 1935 |
| 2,228,721 | Edmonson | Jan. 14, 1941 |
| 2,301,338 | Smith | Nov. 10, 1942 |
| 2,327,079 | Wacker | Aug. 17, 1943 |
| 2,339,452 | Bailey et al. | Jan. 18, 1944 |

OTHER REFERENCES

Ser. No. 391,198, Chapuis (A. P. C.), published June 15, 1943.